United States Patent [19]
McCarty et al.

[11] 4,369,895
[45] Jan. 25, 1983

[54] SEED PLANTER MONITOR

[75] Inventors: John J. McCarty, Peoria; Kerry L. Meyer, Bloomington, both of Ill.

[73] Assignee: Field Electronics Inc., Bloomington, Ill.

[21] Appl. No.: 137,302

[22] Filed: Apr. 4, 1980

[51] Int. Cl.³ .............................................. A01C 7/18
[52] U.S. Cl. .......................................... 221/3; 111/1; 221/8; 340/684
[58] Field of Search ....................... 221/2, 3, 8; 111/1; 340/608, 609, 673, 674, 684

[56] References Cited

U.S. PATENT DOCUMENTS

| | | | |
|---|---|---|---|
| 3,527,928 | 9/1970 | Ryder et al. | 340/684 X |
| 3,927,400 | 12/1975 | Knepler | 340/684 |
| 3,928,751 | 12/1975 | Fathauer | 111/1 X |
| 4,054,779 | 10/1977 | Wilke | 111/1 X |
| 4,159,064 | 6/1979 | Hood | 221/8 |
| 4,239,010 | 12/1980 | Amburn | 340/684 X |

Primary Examiner—Robert J. Spar
Assistant Examiner—Edward M. Wacyra
Attorney, Agent, or Firm—McCaleb, Lucas & Brugman

[57] ABSTRACT

A seed planter monitor is used with a traveling seed planter operable to periodically dispense seeds in each of a plurality of rows. The monitor scans the outputs of seed sensors which provide electrical signals as the seeds are dispensed. A detector triggers an alarm in the absence of output signals from an examined seed sensor during a predetermined time period. A visual display identifies the row being examined by the scanner.

9 Claims, 1 Drawing Figure

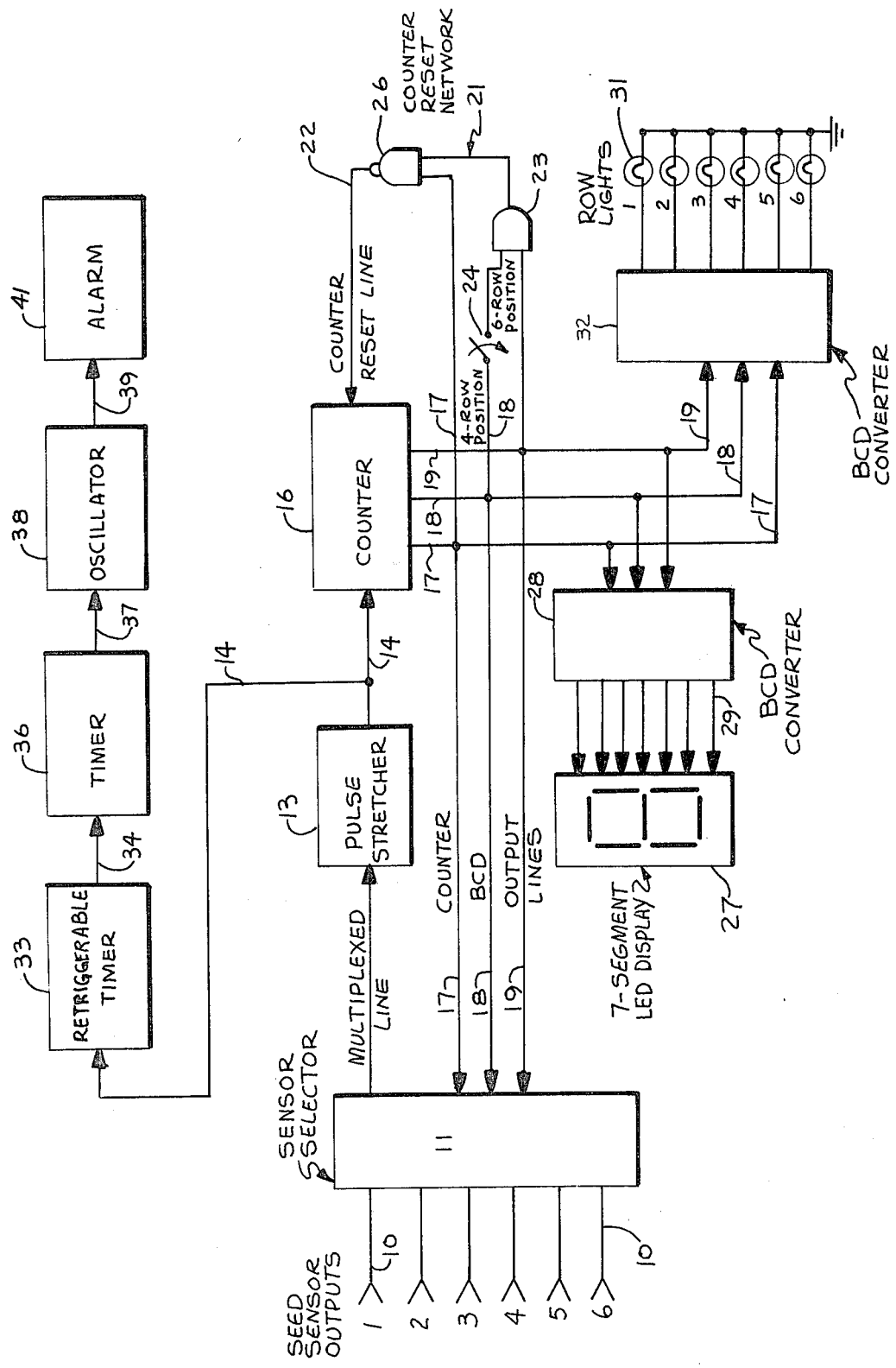

SEED PLANTER MONITOR

BACKGROUND OF THE INVENTION

1. Field of the Invention

The present invention relates in general to seed planters and, more particularly, to automatic monitors for use with such devices.

2. Description of the Prior Art

As is well-known in the art, a modern seed planter typically contains a group of seed chutes, one for each row, which automatically dispenses individual seeds from hoppers into furrows formed in the ground by the planter as it is moved across the field by a tractor. Sophisticated seed planter monitors typically employ electronic counting devices which receive electrical pulse signals from seed sensors located in the seed dispensing chutes and, in connection with distance measuring devices, compute and display the planted seed population per unit of area. See, for example, Fathauer U.S. Pat. No. 3,928,751, issued Dec. 23, 1975.

Although the information provided by such monitors is certainly useful to the planter operator, such devices are relatively expensive. We have found that need has arisen for a relatively inexpensive seed planter monitor which simply informs the planter operator of a planting stoppage in any one of the rows at or shortly after such a stoppage occurs.

SUMMARY OF THE INVENTION

The seed planter monitor of the present invention satisfies this need. In general, it comprises a scanner which examines the outputs of seed sensors each associated with one of the planter rows. A detector in circuit with the scanner provides an alarm signal in the absence of signals from an examined seed sensor during a short predetermined time period, a condition which reflects a blockage or stoppage of seed planting. An alarm promptly warns the tractor operator of this condition so that corrective action can be immediately taken.

Accordingly, it is an important object of the present invention to provide an automatic monitor for a seed planter which is relatively inexpensive.

It is another important object of the present invention to provide a seed planter monitor which scans the outputs of seed sensors associated with the planter rows and, at each examined row, determines whether the planter is functioning.

A further important object of the present invention is to provide an alarm which warns the operator of a row blockage or stoppage and indicates the row at which this condition is occurring.

These and other objects of the present invention will become apparent from the following description which, when taken in conjunction with the accompanying drawing, discloses a preferred embodiment of the invention.

BRIEF DESCRIPTION OF THE DRAWING

The single drawing is a schematic block diagram of electronic features of the planter monitor of the present invention.

DESCRIPTION OF THE PREFERRED EMBODIMENT

The seed planter monitor of the present invention is utilized in conjunction with a multiple-row seed planter (not shown) having a planting mechanism for each row. As is well-known in the art, in such a planting mechanism, a seed dispensing chute is connected to an associated seed hopper, which stores the seed during planting. As the seed planter is moved by a tractor across the field, a dispensing mechanism periodically dispenses seeds through the chute into a furrow formed in the ground. For each row planting mechanism, a seed sensor (not shown), preferably an optical device such as that disclosed in Bell U.S. Pat. No. 4,163,507, issued Aug. 7, 1979 and entitled "OPTICAL SEED SENSOR FOR A SEED PLANTER MONITOR", is connected to the seed planter monitor of the present invention. This seed sensor, which contains light-emitting diodes and a light-receiving solar cell, provides an electrical pulse or signal to the monitor each time a seed drops down the chute past the sensor. The details of the planter mechanism and seed sensor are known in the art and do not require detailed description here.

With reference to the drawing, the preferred embodiment of the seed planter monitor of the present invention is disclosed in conjunction with a six-row planter. Of course, this monitor can be used with a planter for any number of rows, with appropriate modification of the illustrated circuitry.

As shown in the drawing, a plurality of seed sensor output lines 10 connect the outputs of the seed sensors associated with their respective row planter mechanisms. As each seed is dispensed, each seed sensor provides an electrical signal on its output line 10.

The present invention comprises means for scanning the outputs of the seed sensors. For this purpose, a sensor selector 11 comprising a multiplexer-demultiplexer provides electrical signals representative of dispensed seeds for each individually examined row on a multiplexed line 12. A known pulse stretcher 13, which comprises a one-shot multivibrator, is connected in series with line 12 and another line 14. A counter 16, triggered by each pulse on line 14, provides binary signals on BCD output lines 17, 18 and 19 for controlling the row selector 11 for selection of which one of the seed sensor outputs is to be examined. Of course, as is well-known to those skilled in the art, the number of counter output lines is determined by the number of seed sensor outputs to be examined; the three counter output lines shown in the drawing can control a sensor selector for selecting up to eight individual seed sensor outputs.

Lines 17, 18 and 19 are also connected to a counter reset network, generally designated by reference numeral 21, which provides a reset signal on a counter reset line 22 for the purpose of resetting the counter 16 to control the sensor selector 11 for sequential and repetitive scanning of the seed sensor output lines 10. The counter reset network 21 comprises an AND gate 23 having one input connected to line 19, and another input connected to line 18 through a single-pole, single-throw switch 24. The output of a NAND gate 26 is connected to the counter reset line 22. One input of NAND gate 26 is connected to the output of AND gate 23. When switch 24 is in its open or four-row position, the counter reset network controls the counter 16 to sequentially and repetitively scan four seed sensor output lines 10. When switch 24 is in its closed or six-row position, the counter reset network 21 similarly controls the counter 16 to control the sensor selector 11 for examination of six seed sensor outputs 10. As a result, the circuitry illustrated in the drawing can be used for monitoring either four-row or six-row planters.

Lines 17, 18 and 19 are also connected to a visual display for identifying the number of the row being examined by the sensor selector 11. For this purpose, lines 17, 18 and 19 are connected to a seven-segment LED digital display 27 through a BCD converter 28 and a group of lines 29. Alternatively, the digital display 27 may be of the liquid crystal type. Lines 17, 18 and 19 are also in circuit with a group of row lights 31, each corresponding to a single row, through another BCD converter 32.

The seed planter monitor of the present invention also comprises a detecting means operable to provide an alarm signal to initiate a preferably audible alarm in the absence of output signals from a scanned or examined seed sensor output during a relatively short, predetermined time period to inform the planter operator that seeds are not being planted by the planting mechanism in the examined row. For this purpose, line 14 is also connected to a retriggerable timer 33; if this timer 33 does not receive pulses (from the pulse stretcher 13 connected to the multiplexed line 12) during a time period preferably on the order of two seconds, the timer 33 changes states to provide at its output on a line 34 an alarm signal to an alarm timer 36, causing timer 36 to turn on for a time period preferably on the order of about five seconds. The actuation of timer 36 generates a signal at its output on a line 37 to initiate operation of an oscillator 38 which, in turn, provides on its output line 39 a drive signal, preferably at a frequency on the order of two pulses per second, to an audible alarm 41, such as a known "Sonalert" device. Thus, if the seed sensor output 10 of the row being examined fails to indicate any seed planting activity during a two-second time period, the retriggerable timer 33 initiates operation of the alarm 41 to provide a warning signal which lasts five seconds and consists of a two cycle-per-second audible "beeping". The two second time period determined by the retriggerable timer 33 is chosen to be short enough so that the planter operator will be warned promptly of a row planting mechanism stoppage so that corrective action can be taken before the planter travels too far with a defective planter.

The pulse stretcher 13 extends the time period of each of the pulses on the multiplexed line 12 (which are of short duration) in order that the LED display 27 and the row lights 31 will remain on long enough to provide an adequate visual display.

It will be recognized that the row lights 31 do not become illuminated each time a seed is planted. Rather, the purpose of the row lights 31 and the LED display 27 is to identify the row being examined. If the planting mechanism of the examined row is operating, its corresponding row light 31 will be illuminated and the LED display 27 will display the row number, both during a time period of about 60 milliseconds. If the planting mechanism of the examined row is not operating, the corresponding row light 31 and the LED display 27 will remain on until the condition is corrected and pulses resume on line 12 to advance the counter 16.

It is thought that the present invention and its attendant advantages will be understood from the foregoing description. It is apparent that changes may be made in the form of its components without departing from the spirit and scope of the invention, the form described being merely a preferred embodiment.

The embodiments of the invention in which an exclusive property or privilege is claimed are defined as follows:

1. A monitor for a seed planter operable to periodically dispense seeds in each of a plurality of rows, comprising:
   seed sensing means for each row operable to provide an electrical signal at an output as each seed is dispensed;
   seed sensor selector means in circuit with the seed sensing means outputs and being operable to provide, at a selector output, selector signals corresponding to the electrical signals supplied by a selected one of the seed sensing means;
   advancing means in circuit with the selector output and operatively triggered by each said selector signal to control the seed sensor selector means for sequential selection of the seed sensing means outputs;
   detecting means in circuit with the selector output for providing an alarm signal in the absence of a signal from a selected seed sensing means output during a predetermined time period; and
   alarm means actuated in response to the alarm signal.

2. The monitor of claim 1 having display means in circuit with the sensor selector means and being operable to visually identify the row associated with the selected seed sensing means output.

3. The monitor of claim 2 wherein the display means comprises a digitial display and a group of row lights, each row light corresponding to one of the seed sensing means.

4. The monitor of claim 1 and means for resetting the advancing means in order to control the sensor selector means for periodic selection of the seed sensing means outputs.

5. The monitor of claim 1 wherein the alarm means comprises an audible alarm.

6. The monitor of claim 5 wherein the alarm means comprises a timer in circuit with an oscillator, both operable to control the audible alarm to provide a beeping sound for a time period determined by the timer.

7. The monitor of claim 1 wherein the detecting means comprises a retriggerable timer.

8. The monitor of claim 1 wherein the advancing means comprises a counter having a plurality of BCD output lines in circuit with the sensor selector means.

9. The monitor of claim 1 wherein the seed sensor selector means comprises a multiplexer-demultiplexer.

* * * * *